US012698873B2

(12) United States Patent
Heijmans et al.

(10) Patent No.: US 12,698,873 B2
(45) Date of Patent: Aug. 4, 2026

(54) THERMAL PERFORMANCE FOR SPOT LAMPS

(71) Applicant: SIGNIFY HOLDING B.V., Eindhoven (NL)

(72) Inventors: Martinus Arnoldus Cornelis Heijmans, Veldhoven (NL); Oliver Francis Burke, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/875,845

(22) PCT Filed: Jun. 13, 2023

(86) PCT No.: PCT/EP2023/065788

§ 371 (c)(1),
(2) Date: Dec. 17, 2024

(87) PCT Pub. No.: WO2023/242183

PCT Pub. Date: Dec. 21, 2023

(65) Prior Publication Data

US 2025/0383053 A1 Dec. 18, 2025

(30) Foreign Application Priority Data

Jun. 17, 2022 (EP) .................................... 22179537

(51) Int. Cl.
*F21K 9/68* (2016.01)
*F21K 9/238* (2016.01)
(Continued)

(52) U.S. Cl.
CPC ................ *F21K 9/68* (2016.08); *F21K 9/238* (2016.08); *F21K 9/64* (2016.08); *F21Y 2113/17* (2016.08); *F21Y 2115/10* (2016.08)

(58) Field of Classification Search
CPC ................ F21K 9/238; F21K 9/64–69; F21Y 2113/10–17; F21Y 2115/10
See application file for complete search history.

(56) References Cited

U.S. PATENT DOCUMENTS 9,175,811 B2 * 11/2015 Van De Ven ............. F21K 9/68
10,563,824 B2 * 2/2020 Yeung ..................... F21V 29/80
2007/0236911 A1 * 10/2007 Negley ..................... F21V 9/30
362/84

FOREIGN PATENT DOCUMENTS

CN 112413418 A 2/2021
EP 2447597 A1 5/2012
(Continued)

*Primary Examiner* — Jason M Han

(57) ABSTRACT

The invention provides a light generating system (1000) comprising a housing (500) and a light generating device (100); wherein the light generating device (100) comprises an elongated support (150) and a plurality of light sources (10), wherein the light sources (10) comprise solid state light sources supported by the elongated support (150); wherein the light sources are configured to generate light source light (11); wherein the housing (500) is thermally conductive; wherein the housing (500) comprises a reflective inner surface (510) comprising a staircase profile (520) with n stairs (521), wherein n≥2; wherein the n stairs have a stair length L1; wherein the reflective inner surface (510) is reflective for the light source light (11); wherein the light generating device (100) is mounted on the staircase profile (520) over at least part of the stair length L1 and configured in thermal contact with the housing (500).

12 Claims, 6 Drawing Sheets

(51) Int. Cl.

| | |
|---|---|
| ***F21K 9/64*** | (2016.01) |
| ***F21Y 113/17*** | (2016.01) |
| ***F21Y 115/10*** | (2016.01) |

(56) References Cited

FOREIGN PATENT DOCUMENTS

| | | | |
|---|---|---|---|
| EP | 3636995 | B1 | 7/2023 |
| JP | 2002184209 | A | 6/2002 |
| KR | 20140103666 | A | 8/2014 |
| WO | 2011100195 | A1 | 8/2011 |
| WO | 2015052608 | A1 | 4/2015 |

* cited by examiner (I)

(II)

THERMAL PERFORMANCE FOR SPOT LAMPS

CROSS-REFERENCE TO PRIOR APPLICATIONS

This application is the U.S. National Phase application under 35 U.S.C. § 371 of International Application No. PCT/EP2023/065788, filed on Jun. 13, 2023, which claims the benefit of European Patent application Ser. No. 22/179,537.0, filed on Jun. 17, 2022. These applications are hereby incorporated by reference herein.

FIELD OF THE INVENTION

The invention relates to a light generating system. The invention further relates to a lighting device comprising such light generating system.

BACKGROUND OF THE INVENTION

LED lighting lamps are known in the art. For instance, EP3636995 describes an LED lighting lamp with an enhanced heat dissipation function. The LED lighting lamp is configured to be fitted into and connected to a socket, enables high temperature heat generated when LEDs are turned on to be rapidly dissipated to the outside through heat dissipation fins formed in a main body so as to have a further improved heat dissipation function, and allows simple assembly thereof so as to significantly improve productivity and repair workability. The lighting lamp of the present invention includes a main body which has a fitting hole formed inwardly through a center portion of an upper surface of the main body, a plurality of heat dissipating fins formed along an outer peripheral surface of the fitting hole, and a mounting surface formed on a lower portion of the main body, the mounting surface having a single annular heat dissipating groove or a plurality of annular heat dissipating grooves, an LED module which is installed to be in close contact with the mounting surface formed on the lower portion of the main body and has a plurality of LEDs installed on a bottom surface of the LED module, a cylindrical fastening boss which is fastened by means of a screw to the LED module, which is in close contact with the mounting surface of the main body, while being fitted and coupled through the fitting hole from an upper side of the main body, a connection portion which is fitted into and electrically connected to a socket provided on a ceiling, a wall surface, or the like while being fitted and fixed to an outside of an upper portion of the fastening boss, a lens holder which is fitted and coupled to the bottom surface of the LED module so as to be spaced apart therefrom by a predetermined distance and has lenses mounted at positions corresponding to the respective LEDs constituting the LED module so as to diffuse illumination light emitted from the LEDs and irradiate the illumination light, and a ring-shaped fixing cap which is coupled to a lower end of the main body and is fastened to the lower end by means of a screw while enclosing the LED module and the lens holder.

SUMMARY OF THE INVENTION

Light generating devices are interesting for various applications including spots, stage-lighting, headlamps, home and office lighting, and (fluorescence) microscopy and endoscopy etc. However, operating a light source in general generates heat, which may negatively affect the performance and lifespan of the light generating device.

The performance of semiconductor based light sources (such as LED based lamps or solid-state light sources) may especially be dependent on the temperature. A high junction temperature may inversely affect the output of light i.e. the brightness of the light provided by the light source. These light sources may output light at higher brightness when they are operated at low temperatures. Typically, these light sources may dissipate heat from the light source to the ambient environment. However, the temperature difference between the junction temperature and the ambient temperature may not always be sufficient to effectively cool the light source. Hence, the inefficient dissipation of heat may reduce the efficiency, or the brightness, of the light provided by the light source.

Prolonged exposure to heat may (also) damage the components in the lighting device, such as the supporting elements or the housing of the lighting device. Metallic components in the lighting device may expand disproportionately causing strain in the lighting device. Moreover, the performance of electrical components (for example in a control unit or a sensor unit) that facilitate the functioning of the light source may (also) be affected by the heat dissipated from the light source. Constant exposure to high temperatures may lead to permanent damage of the lighting device. Yet further, the electronic components may consume more power to operate at higher temperatures.

Passive cooling, wherein heat may be dissipated to the ambient environment through a heatsink, may be applied. Additionally or alternatively, active cooling solutions may be used, which may comprise providing or circulating a cold liquid along the light source. Both approaches may suffer from their respective drawbacks. Passive cooling solutions may require a short thermal path from the heat source to the ambient environment to function effectively. The cooling of the electronics in spot lamps, including LEDs and driver components, may be determined by the surface of the housing. Spot lamps may comprise a heat spreader that may make contact with the housing. The heat may be transported via the heat spreader to a heatsink and then to the housing. This stepwise transfer of heat may increase the thermal resistance of the light source to the ambient environment. Further, the small volume and area of the housing may limit the transfer of heat from the spot lamp to the ambient environment, and thus may limit performance of the spot lamp. Passive cooling solutions may further utilize fins or vanes in the heat sink structure. However, fins or vanes may be exposed, and hence may be hot to touch. This may make their use difficult in situations such as in a home, an office, or a workshop. Alternatively, active cooling solutions may be able to cool the lighting device effectively, for example by means of a radiator or circulating a cooling liquid. However, such solutions may be cumbersome. For instance, the cooling liquid may have to be pumped or circulated to remove heat from the light source. This may increase the power consumed by the device. Further, this may make the lighting device heavier and therefore, require a bulky construction to accommodate the additional components required to circulate a liquid. Further, dedicated cooling devices may be relatively expensive.

Hence, it is an aspect of the invention to provide an alternative light generating system, which preferably further at least partly obviates one or more of above-described drawbacks. The present invention may have as object to overcome or ameliorate at least one of the disadvantages of the prior art, or to provide a useful alternative.

According to a first aspect, the invention provides a light generating system ("system") comprising a housing and a light generating device ("device"). Especially, the light generating device may comprise an elongated support. It may further comprise a plurality of light sources. Especially, the light sources may comprise solid state light sources. In embodiments, the light sources may be supported by the elongated support. The light sources may, in embodiments, be configured to generate light source light. Further, in embodiments, the housing may be thermally conductive. Yet further, in embodiments, the housing may comprise a reflective inner surface. Especially, the housing may comprise a staircase profile with n stairs. More especially, the staircase profile may comprise n≥2 stairs. Further, in embodiments, the n stairs may have a total stair length L1. Yet further, in embodiments the reflective inner surface may be reflective for the light source light. The light generating device, in embodiments, may be mounted on the staircase profile over at least part of the stair length L1. Further, the light generating device may, in embodiments, be configured in thermal contact with the housing. Hence, in specific embodiments the invention provides a light generating system comprising a housing and a light generating device, wherein the light generating device comprises an elongated support and a plurality of light sources; wherein the light sources comprise solid state light sources supported by the elongated support, wherein the light sources may be configured to generate light source light; wherein the housing may be thermally conductive; wherein the housing comprises a reflective inner surface comprising a staircase profile with n stairs, wherein n≥2, wherein the n stairs may have a stair length L1; wherein the reflective inner surface may be reflective for the light source light; wherein the light generating device may be mounted on the staircase profile over at least part of the stair length L1 and may be configured in thermal contact with the housing.

Yet, in further embodiments the light generating system may be configured to generate system light comprising light source light. Especially, at least part of the system light comprises light source light reflected at the reflective inner surface of the housing. Hence, the invention may provide improved thermal performance for e.g. spot lamps. Further, in embodiments the system light may essentially consist of the light source light.

With the present system, it may be possible to improve the thermal management in a light generating system, such as a spot lamp. In the present system, the thermal path from the light source to the ambient environment may be shorter. The light source may be placed directly on the housing, which may decrease the thermal resistance from the light source to the ambient environment, and may thus result in a thermal dissipation gain. Improved thermal management may result in a higher luminous flux, an improved efficiency, and an improved lifetime of the light generating system. Another advantage may be that one or more light generating devices may be mounted on the housing (wall), which may leave space in the center of the lamp, for example for the driver components to fit in. Additionally or alternatively, it may be possible to use solid state light sources, such as microLEDs, which may provide the beneficial incorporation of an increased number of light sources as compared to a light generating device with a chip-on-board-design (CoB). With the increased number of light sources, the lamp performance and brightness may be increased and/or controllability of the system light and its spectral power distribution may be provided or increased. Here below, first some general embodiments of the system are described, followed by some more specific embodiments.

In embodiments, the light generating system may comprise a housing and a light generating device.

The light generating device may especially be configured to generate device light. Especially, the light generating device may comprise a light source. The light source may especially be configured to generate light source light. In embodiments, the device light may essentially consist of the device light. In other embodiments, the device light may essentially consist of converted light source light. In yet other embodiments, the device light may comprise (unconverted) light source light and converted light source light. Light source light may be converted with a luminescent material into luminescent material light and/or with an upconverter into upconverted light (see also below). The term "light generating device" may also refer to a plurality of light generating devices which may provide device light having essentially the same spectral power distributions. In specific embodiments, the term "light generating device" may also refer to a plurality of light generating devices which may provide device light having different spectral power distributions.

The term "light source" may in principle relate to any light source known in the art. It may be a conventional (tungsten) light bulb, a low pressure mercury lamp, a high pressure mercury lamp, a fluorescent lamp, an LED (light emissive diode). In specific embodiments, the light source comprises a solid state LED light source (such as an LED or laser diode (or "diode laser")). The term "light source" may also relate to a plurality of light sources, such as 2-2000 (solid state) LED light sources. Hence, the term LED may also refer to a plurality of LEDs. Further, the term "light source" may in embodiments also refer to a so-called chips-on-board (COB) light source. The term "COB" especially refers to LED chips in the form of a semiconductor chip that is neither encased nor connected but directly mounted onto a substrate, such as a PCB. Hence, a plurality of light emitting semiconductor light sources may be configured on the same substrate. In embodiments, a COB is a multi LED chip configured together as a single lighting module. The term "light source" may also refer to a chip scaled package (CSP). A CSP may comprise a single solid state die with provided thereon a luminescent material comprising layer. The term "light source" may also refer to a midpower package. A midpower package may comprise one or more solid state die(s). The die(s) may be covered by a luminescent material comprising layer. The die dimensions may be equal to or smaller than 2 mm, such as in the range of e.g. 0.2-2 mm. Hence, in embodiments the light source comprises a solid state light source. Further, in specific embodiments, the light source comprises a chip scale packaged LED. Herein, the term "light source" may also especially refer to a small solid state light source, such as having a mini size or micro size. For instance, the light sources may comprise one or more of mini LEDs and micro LEDs. Especially, in embodiments the light sources may comprise micro LEDs or "microLEDs" or "μLEDs". Herein, the term mini size or mini LED especially indicates solid state light sources having dimensions, such as die dimensions, especially length and width, selected from the range of 100 μm-1 mm. Herein, the term u size or micro LED especially indicates solid state light sources having dimensions, such as die dimensions, especially length and width, selected from the range of 100 μm and smaller.

The light source may have a light escape surface. Referring to conventional light sources such as light bulbs or fluorescent lamps, it may be an outer surface of a glass or a quartz envelope. For LED's it may for instance be the LED die, or when a resin is applied to the LED die, the outer surface of the resin. In principle, it may also be the terminal end of a fiber. The term escape surface especially relates to that part of the light source, where the light actually leaves or escapes from the light source. The light source is configured to provide a beam of light. This beam of light (thus) escapes from the light exit surface of the light source.

Likewise, a light generating device may comprise a light escape surface, such as an end window. Further, likewise a light generating system may comprise a light escape surface, such as an end window.

The term "light source" may refer to a semiconductor light-emitting device, such as a light emitting diode (LEDs), a resonant cavity light emitting diode (RCLED), a vertical cavity laser diode (VCSELs), an edge emitting laser, etc. . . . The term "light source" may also refer to an organic light-emitting diode (OLED), such as a passive-matrix (PMOLED) or an active-matrix (AMOLED). In specific embodiments, the light source comprises a solid-state light source (such as an LED or laser diode). In embodiments, the light source comprises an LED (light emitting diode). The terms "light source" or "solid state light source" may also refer to a superluminescent diode (SLED).

The term LED may also refer to a plurality of LEDs.

The term "light source" may also relate to a plurality of (essentially identical (or different)) light sources, such as 2-2000 solid state light sources. In embodiments, the light source may comprise one or more micro-optical elements (array of micro lenses) downstream of a single solid-state light source, such as an LED, or downstream of a plurality of solid-state light sources (i.e. e.g. shared by multiple LEDs). In embodiments, the light source may comprise an LED with on-chip optics. In embodiments, the light source comprises pixelated single LEDs (with or without optics) (offering in embodiments on-chip beam steering).

In embodiments, the light source may be configured to provide primary radiation, which is used as such, such as e.g. a blue light source, like a blue LED, or a green light source, such as a green LED, and a red light source, such as a red LED. Such LEDs, which may not comprise a luminescent material ("phosphor") may be indicated as direct color LEDs.

In other embodiments, however, the light source may be configured to provide primary radiation and part of the primary radiation is converted into secondary radiation. Secondary radiation may be based on conversion by a luminescent material. The secondary radiation may therefore also be indicated as luminescent material radiation. The luminescent material may in embodiments be comprised by the light source, such as an LED with a luminescent material layer or dome comprising luminescent material. Such LEDs may be indicated as phosphor converted LEDs or PC LEDs (phosphor converted LEDs). In other embodiments, the luminescent material may be configured at some distance ("remote") from the light source, such as an LED with a luminescent material layer not in physical contact with a die of the LED. Hence, in specific embodiments the light source may be a light source that during operation emits at least light at wavelength selected from the range of 380-470 nm. However, other wavelengths may also be possible. This light may partially be used by the luminescent material.

In embodiments, the light generating device may comprise a luminescent material. In embodiments, the light generating device may comprise a PC LED. In other embodiments, the light generating device may comprise a direct LED (i.e. no phosphor). In embodiments, the light generating device may comprise a laser device, like a laser diode. In embodiments, the light generating device may comprise a superluminescent diode. Hence, in specific embodiments, the light source may be selected from the group of laser diodes and superluminescent diodes. In other embodiments, the light source may comprise an LED.

The light source may especially be configured to generate light source light having an optical axis (O), (a beam shape,) and a spectral power distribution. The light source light may in embodiments comprise one or more bands, having band widths as known for lasers.

The term "light source" may (thus) refer to a light generating element as such, like e.g. a solid state light source, or e.g. to a package of the light generating element, such as a solid state light source, and one or more of a luminescent material comprising element and (other) optics, like a lens, a collimator. A light converter element ("converter element" or "converter") may comprise a luminescent material comprising element. For instance, a solid state light source as such, like a blue LED, is a light source. A combination of a solid state light source (as light generating element) and a light converter element, such as a blue LED and a light converter element, optically coupled to the solid state light source, may also be a light source (but may also be indicated as light generating device). Hence, a white LED is a light source (but may e.g. also be indicated as (white) light generating device).

The term "light source" herein may also refer to a light source comprising a solid state light source, such as an LED or a laser diode or a superluminescent diode.

The term "light source" may (thus) in embodiments also refer to a light source that is (also) based on conversion of light, such as a light source in combination with a luminescent converter material. Hence, the term "light source" may also refer to a combination of an LED with a luminescent material configured to convert at least part of the LED radiation, or to a combination of a (diode) laser with a luminescent material configured to convert at least part of the (diode) laser radiation.

In embodiments, the term "light source" may also refer to a combination of a light source, like an LED, and an optical filter, which may change the spectral power distribution of the light generated by the light source. Especially, the term "light generating device" may be used to address a light source and further (optical components), like an optical filter and/or a beam shaping element, etc.

The phrases "different light sources" or "a plurality of different light sources", and similar phrases, may in embodiments refer to a plurality of solid-state light sources selected from at least two different bins. Likewise, the phrases "identical light sources" or "a plurality of same light sources", and similar phrases, may in embodiments refer to a plurality of solid-state light sources selected from the same bin.

The term "solid state light source", or "solid state material light source", and similar terms, may especially refer to semiconductor light sources, such as a light emitting diode (LED), a diode laser, or a superluminescent diode.

Especially, the light generating device may comprise a plurality of light sources. More especially, the plurality of light sources may, in embodiments, comprise solid state light sources. Especially, the plurality of light sources may be configured to generate light source light. The solid state light sources may be LEDs, such as microLEDs (see also above and further below).

Especially, the light generating device may comprise an elongated support. The elongated support may be a rigid or semi-rigid support. However, the elongated support may also be flexible. The plurality of light sources (comprised by the light generating device) may be supported by the elongated support (which may also be comprised by the light generating device). The elongated support may comprise components that may electrically connect the one or more of the light sources with an electrical component and/or with an (external) source of electrical energy. For instance, the elongated support may comprise a PCB (see further also below).

Note that the term "light generating device" may also refer to a plurality of light generating devices.

As indicated above, the light generating system may comprise a housing. The housing may be configured to at least partially enclose the plurality of light sources. Further, the housing may at least partly enclose electronics, such as e.g. a driver for the plurality of light sources.

In embodiments, the light generating system may comprise a housing and a light transmissive window. The housing and the light transmissive window may form an envelope for the plurality of light sources. The light transmissive window may comprise a light transmissive material. The light transmissive window may be transparent or translucent. Especially, the light transmissive window may be transparent. The light transmissive window may be essentially planer, or may have an envelope shape.

The light transmissive material may comprise one or more materials selected from the group consisting of a transmissive organic material, such as selected from the group consisting of PE (polyethylene), PP (polypropylene), PEN (polyethylene napthalate), PC (polycarbonate), polyurethanes (PU), polymethylacrylate (PMA), polymethylmethacrylate (PMMA) (Plexiglas or Perspex), polymethacrylimide (PMI), polymethylmethacrylimide (PMMI), styrene acrylonitrile resin (SAN), cellulose acetate butyrate (CAB), silicone, polyvinylchloride (PVC), polyethylene terephthalate (PET), including in embodiments (PETG) (glycol modified polyethylene terephthalate), PDMS (polydimethylsiloxane), and COC (cyclo olefin copolymer). Especially, the light transmissive material may comprise an aromatic polyester, or a copolymer thereof, such as e.g. one or more of polycarbonate (PC), poly (methyl) methacrylate (P (M) MA), polyglycolide or polyglycolic acid (PGA), polylactic acid (PLA), polycaprolactone (PCL), polyethylene adipate (PEA), polyhydroxy alkanoate (PHA), polyhydroxy butyrate (PHB), poly(3-hydroxybutyrate-co-3-hydroxyvalerate) (PHBV), polyethylene terephthalate (PET), polybutylene terephthalate (PBT), polytrimethylene terephthalate (PTT), polyethylene naphthalate (PEN). Especially, the light transmissive material may comprise polyethylene terephthalate (PET). Hence, the light transmissive material is especially a polymeric light transmissive material. However, in another embodiment the light transmissive material may comprise an inorganic material. Especially, the inorganic light transmissive material may be selected from the group consisting of glasses, (fused) quartz, transmissive ceramic materials, and silicones. Also hybrid materials, comprising both inorganic and organic parts may be applied. Especially, the light transmissive material comprises one or more of PMMA, transparent PC, or glass. For instance, the light transmissive material may comprise a ceramic body, like a garnet type of material. In alterative embodiments, the light transmissive material may comprise an alumina material, such as an $Al_2O_3$ based material. In embodiments, the light transmissive material may comprise e.g. sapphire. Other materials may also be possible like one or more of $CaF_2$, MgO, $BaF_2$, $A_3B_5O_{12}$ garnet, ALON (aluminum oxynitride), $MgAl_2O_4$ and $MgF_2$.

The housing and the optional light transmissive window may provide in embodiments a retrofit lamp.

The system may comprise an assembly of the housing and the light generating device(s) and optionally the light transmissive window. Instead of the term "assembly" also the term "lamp assembly" or "lamp unit" may be applied. For instance, the lamp assembly may be a spot lamp.

The housing may comprise a housing wall. In embodiments, the housing wall may comprise a material selected from the group comprising aluminum, steel, copper, brass, a polymeric material, a ceramic material, and a 3D printed material. In specific embodiments, the housing may comprise a metal (or metallic material). The use of a metal for the housing material may require die-casting, due to variable wall thicknesses.

The housing may further, in embodiments, comprise a reflective inner surface, which may especially be reflective for the light source light. More especially, the reflective inner surface may provide specular reflection of the light source light. The reflective inner surface may, e.g. be provided by an aluminum coating layer, a silver coating layer, or a white coating layer (on the housing wall). Alternatively or additionally, at least part of the housing wall, or even essentially the entire housing wall, may be provided by a material that is reflective for light as such, such as e.g. aluminum, steel, copper, or brass. Further, the polymeric material may be reflective, e.g. by embedded metal particles and/or embedded white particles. Yet further, the ceramic material may be diffuse reflective. Yet further, the 3D printed material may be reflective, e.g. by embedded metal particles and/or embedded white particles.

Hence, in embodiments the housing may be a monolithic body, having a reflective inner surface.

Yet further, in embodiments, the reflective inner surface may comprise a staircase profile with n stairs (or "stair windings"). Especially, n may be selected from the range of ≥2, such as from the range of ≥3, or from the range of ≥4, especially from the range of 2-8, such as selected from the range of 3-6.

The housing may comprise a first housing end and a second housing end. The light generating device, more especially the light sources, may be configured between the first housing end and the second housing end. Further, the housing and optional envelope may comprise a lamp axis. The virtual lamp axis may virtually connect the first housing end and the second housing end. The lamp axis may be an axis of rotational symmetry.

When following the housing wall in a direction from one housing end to the second housing end, two or more of the stairs may be encountered. Each stair may fully surround the lamp axis, though other embodiments are herein not excluded. As indicated further below, in embodiments such stairs may circularly surround the lamp axis or spirally surround the lamp axis. Instead of the term "stair" also the terms "winding" or "stair winding" may be applied.

The n stairs may comprise a total stair length L1. Instead of the term "total stair length", herein also the term "stair length" is used. Especially, the stair length may be defined as the total length of the stair windings. For example, the total stair length L1 may be selected from the range of 4-100 cm, such as from the range of 5-75 cm, especially from the range of 10-60 cm.

Furthermore, the stair windings may have a diameter (or stair diameter) and a stair width. Especially, in embodiments the diameter may be selected from the range of 10-80 mm, such as from the range of 15-65 mm, more especially selected from the range of 20-50 cm. Alternatively or additionally, in embodiments the stair width may be selected from the range of 0.5-15 mm, such as from the range of 1-5 mm.

When the stairs circularly surround the lamp axis, the diameter of the stair windings may be constant for a single stair winding. However, for each stair winding the diameter may increase in a direction from the first housing end to the second housing end. When the stair windings spirally surround the lamp axis, the diameter of the stair windings may constantly increase in a direction from the first housing end to the second housing end. However, in embodiments for essentially the entire staircase profile the stair width may be constant. Hence, in the case of a spiral staircase profile, in embodiments the diameter of the stair windings may gradually increase in a direction from the first housing end to the second housing end, and in the case of circularly surrounding stair windings, in (other) embodiments the diameter of the stair windings may stepwise increase in a direction from the first housing end to the second housing end.

The stairs may have inner diameters and outer diameters. Here, the diameters of the stair windings may be defined as the diameters of the middle of a winding. For instance, a winding having an inner diameter of 25 mm and an outer diameter of 35 mm may have a diameter of 30 mm.

Each stair winding may have a stair winding length. This may be the length of the respective winding determined along the diameter. Hence, in an example wherein the diameter D of the stair windings may be constant for a single stair winding, the length of such stair winding may be π*D. When there are n stair windings, each having a respective diameter Di of the stair winding being constant for the respective single stair winding, the total stair length is $$\sum_{i=1}^{n} \pi * Di.$$

For a spiral staircase profile (with a gradually increasing diameter in a direction from the first housing end to the second housing end), the total stair length may essentially be the length of the helix, determined along the varying diameter.

Furthermore, in embodiments, the outer side of the housing may hug the staircase profile of the reflective inner surface. However, in another embodiment, the outer side of the housing may have a rounded cone shape. Hence, in the former embodiments the outer side of the housing may also have a staircase profile.

In embodiments, the light generating device may be mounted on the staircase profile of the reflective inner surface over at least part of the stair length L1. The elongated support may be configured substantially conformal to at least part of the stair length L1.

Hence, assuming the n stairs circularly surrounding the lamp axis, there may e.g. be k elongated supports, wherein $2 \leq k \leq n$. Hence, two or more of the n stair windings may be provided with a light generating device. The light generating device for a respective stair winding may in such embodiments also have an essentially constant diameter, which may essentially be the same as the diameter of the stair windings. Especially, in embodiments the term "k elongated supports" may refer to k light generating devices.

However, assuming the n stairs being comprised by a spiral staircase profile surrounding the lamp axis, there may be a single elongated support. Hence, two or more of the n stair windings may be provided with a single light generating device. When the stair windings spirally surround the lamp axis, the diameter of the light generating device may constantly increase in a direction from the first housing end to the second housing end, which (local) diameter may essentially be the same as the (local) diameter of the stair winding.

Especially, in embodiments the light generating device may be mounted on the staircase profile of the reflective inner surface for over >50% of the stair length L1, like over >60% of the stair length L1, especially >70% of the stair length L1, even more especially >80% of the stair length L1, such as >90% of the stair length L1, including 100% of the stair length L1.

Especially, the elongated support may have a support length L2. Instead of the term "support length" also the term "total support length" may be applied. For instance, when two or more light generating devices are applied, the sum of the support lengths is the total support length. Assuming n stairs circularly surrounding the lamp axis, k elongated supports, wherein k=n, then the total support length L may e.g. be up to $$\sum_{i=1}^{n} \pi * Di,$$

or a percentage thereof (see also below). However, for a spiral staircase profile (with a gradually increasing diameter in a direction from the first housing end to the second housing end), the total support length L2 may essentially be the length of the helix, determined along the varying diameter, or a percentage thereof (see also below). In specific embodiments, the total support length L2 may be at least 50% of the total stair length L1. Especially, in embodiments $0.5 \leq L2/L1 \leq 1$ (see further also below).

Especially, the light generating device may (thus) be configured in thermal contact with the housing, for example in direct thermal contact with the housing, or in indirect thermal contact with the housing through an intermediate thermally conductive material, such as a thermally conductive adhesive or a thermally conductive solder. More especially, in embodiments the light generating device which may be configured in physical contact with the reflective inner surface. Furthermore, the housing may comprise a thermally conductive material.

The light generating system may, in embodiments, be configured to generate system light. The system light may comprise light source light, especially at least part of the system light may comprise light source light reflected at the reflective inner surface of the housing. The system light may, in embodiments, be white light.

The term "white light" herein, is known to the person skilled in the art. It especially relates to light having a correlated color temperature (CCT) between about 1800 K and 20000 K, such as between 2000 and 20000 K, especially 2700-20000 K, for general lighting especially in the range of about 2700 K and 6500 K. In embodiments, for backlighting purposes the correlated color temperature (CCT) may especially be in the range of about 7000 K and 20000 K. Yet further, in embodiments the correlated color temperature (CCT) is especially within about 15 SDCM (standard deviation of color matching) from the BBL (black body locus), especially within about 10 SDCM from the BBL, even more especially within about 5 SDCM from the BBL. Especially, in embodiments, the system light may be warm white light. Additionally or alternatively, in embodiments, the system light may be cool white light. Furthermore, in embodiments the system light may have a correlated color temperature selected from the range of 1800-20000 K, such as from the range of 5000-20000, like from the range of 1800-12000 K. Additionally or alternatively, the system light may have a color rendering index selected from the range of ≥80, such as from the range of ≥90, like from the range of ≥95. However, the system light may also be colored light (see further also below).

In embodiments, the light generating system may comprise a driver, especially a LED driver. The driver may be configured to protect the light generating device from (undesirable) voltage and/or current fluctuations. Furthermore, the driver may also be configured to rectify high voltages with an alternating current to low voltages with a direct current. Basically, the driver may be configured to vary the voltage and current of the light generating system. The driver may at least partly be enclosed by the housing.

With the present system, it may be possible to improve the thermal performance of the system. Configuring the light generating device in direct physical contact with the reflective inner surface, rather than using intermediate material such as a heat spreader or an adhesive, decreases the number of heat transfer steps. With a decreased number of heat transfer steps, the thermal resistance may also be decreased. Additionally or alternatively, the use of thermally conductive material with a thermal conductivity of at least 0.8 W/(m*K) for the housing may help further decrease the thermal resistance of the system. Decreased thermal resistance may lead to improved passive cooling of the system, thusly increasing the lifespan of the system.

Additionally or alternatively, the variable support length L2 may provide the beneficial incorporation of an increased number of light sources as compared to a light generating device with a chip-on-board-design (CoB). With the increased number of light sources, the lamp performance and brightness may be increased.

In specific embodiments, the light generating device may be configured in physical contact with the reflective inner surface, especially the light generating device may be mounted onto the stairs of the reflective inner surface in direct physical contact. In further specific embodiments, over at least 70% of a length of the light generating device, the light generating device may be configured in physical contact with the reflective surface, such as at least 80%, like at least 80%, for example at least 90%, especially at least 95%, more especially at least 99%, including 100%.

In embodiments, over at least 70% of the support length L2, the elongated support may be configured in thermal contact with the reflective surface, such as at least 80%, like at least 80%, for example at least 90%, especially at least 95%, more especially at least 99%, including 100%.

As indicated above, in embodiments, the housing may comprise a thermally conductive material. Especially, the thermally conductive material may have a thermal conductivity selected from the range of ≥0.8 W/(m*K), such as from the range of >1 W/(m*K), like from the range of >5 W/(m*K), especially from the range of >20 W/(m*K). A thermally conductive material may especially have a thermal conductivity of at least about 20 W/(m*K), like at least about 30 W/(m*K), such as at least about 100 W/(m*K), like especially at least about 200 W/(m*K). In yet further specific embodiments, a thermally conductive material may especially have a thermal conductivity of at least about 10 W/(m*K). In embodiments, the thermally conductive material may comprise one or more of copper, aluminum, silver, gold, silicon carbide, aluminum nitride, boron nitride, aluminum silicon carbide, beryllium oxide, a silicon carbide composite, aluminum silicon carbide, a copper tungsten alloy, a copper molybdenum carbide, carbon, diamond, and graphite. Alternatively, or additionally, the thermally conductive material may comprise or consist of aluminum oxide.

In specific embodiments, the thermally conductive material may be selected from the group comprising aluminum, steel, copper, brass, a polymeric material, a ceramic material, and a 3D printed material (and having a thermal conductivity selected from the range of ≥0.8 W/(m*K)). Therewith, the thermally conductive material may provide the dissipation of heat generated by the light generating device to the ambient environment, thus it may provide passive cooling of the light generating system (more especially the light generating device). Additionally or alternatively, in embodiments, the thermally conductive material may also comprise one or more of silver, gold, tungsten, zinc, aluminum nitride, silicon carbide, diamond, and graphite.

As indicated above, the term "light generating device" may in embodiments refer to a plurality of light generating devices. Hence, the term "elongated support" may in embodiments refer to a plurality of elongated supports.

Hence, the elongated support may in embodiments comprise one or more separate elongated supports. The plurality of light sources may be arranged on the one or more elongated supports. For example, there may be equal amounts of light sources on each of two or more elongated supports. However, in other embodiments, there may also be unequal amounts of light sources on two or more of two or more elongated supports. Furthermore, two or more elongated supports may be equal or unequal in support length.

The one or more elongated supports (together) may have a total support length L2. For example, the total support length L2 may be selected from the range of 4-100 cm, such as from the range of 5-75 cm, especially from the range of 10-60 cm. As indicated above, the total support length L2 may be selected such that $0.5 \leq L2/L1 \leq 1$. In specific embodiments, $0.7 \leq L2/L1 \leq 0.9$, like such that $0.85 \leq L2/L1 \leq 0.99$.

In embodiments, the elongated support may be mechanically attached to the reflective inner surface. This may provide the benefit of an improved thermal performance of the system. Attaching the light generating device in direct physical contact with the reflective inner surface in a mechanical manner, rather than using adhesive, decreases the number of heat transfer steps. With a decreased number of heat transfer steps, the thermal resistance may also be decreased. Decreased thermal resistance may lead to improved passive cooling of the system, thusly increasing the lifespan of the system. In specific embodiments, the elongated support may be attached to the reflective inner surface through the use of clips. In another embodiment, the elongated support may be attached to the reflective inner surface through heat staking or thermoplastic staking. Further, in another embodiment, the elongated support may be attached to the reflective inner surface via a small ridge, wherein the elongated support may be clicked in between the reflective inner surface and the ridge, thusly locking the elongated support into place. Moreover, the elongated support may be attached to the reflective inner surface using a method selected from the group comprising: threading, edge locking, reverse locking, screw locking, and snap locking. Alternatively or additionally, the elongated support may be attached to the reflective inner surface via a (thermally conductive) adhesive (see also above).

Hence, the light generating system may comprise a reflective inner surface. The reflective inner surface may have a reflection for the light source light in the range of at least 70%, more especially at least 75%, even more especially at least 80%, such as in embodiments R≥85%, assuming perpendicular irradiation of the reflective inner surface. Thus, in specific embodiments, the light generating system may comprise a reflective inner surface, wherein the reflective inner surface may have a reflection for the light source light in the range of R≥85% assuming perpendicular irradiation of the reflective inner surface. This may provide the advantage of improved luminous efficiency of the light generating system. In embodiments, the reflective inner surface may have a reflection, assuming perpendicular irradiation of the reflective inner surface, for the light source light of at least 90%, like at least 95%, especially at least 98%, more especially at least 99%, including 100%. Yet further, in embodiments the reflective inner surface may, for example, comprise a reflector, a mirror, or an aluminum foil.

As indicated above, the housing and an optional envelope may have an axis (herein indicated as lamp axis). This axis may be parallel or even coincide with an optical axis of the system light (see also below). In embodiments, the lamp axis may be defined as an imaginary line that defines a path through the housing, and an optional envelope, of the light generating system, along which light propagates through the system. Especially, the lamp axis may coincide with the direction of the light with the highest radiant flux.

In embodiments, at least one of the n stairs of the staircase profile may be tilted relative to the lamp axis. In further embodiments, all of the n stairs of the staircase profile may be tilted relative to the lamp axis. More especially, one or more of the n stairs of the staircase profile may be tilted relative to a plane perpendicular to the lamp axis. For example, in embodiments, one or more of the stairs of the staircase profile may be tilted at least 2° relative to a plane perpendicular the lamp axis, such as at least 2°, like selected from the range of 5-45°. In specific embodiments, all of the stairs of the staircase profile may be tilted relative to the plane perpendicular the lamp axis.

In embodiments, at least one of the n stairs of the staircase profile may be in a plane perpendicular a lamp axis. In specific embodiments, all of the n stairs of the staircase profile may be in planes perpendicular the lamp axis.

In embodiments, at least one of the n stairs of the staircase profile may have a curved shape, such as a parabolic shape. Hence, in a plane including the lamp axis, a cross-sectional shape of the at least one of the n stairs may be curved, such as parabolic. In specific embodiments, all of the n stairs of the staircase profile may have a curved shape, such as a parabolic shape. Especially, the curved shape, such as the parabolic shape, may be concave (though convex is not excluded).

In embodiments, all stairs of the staircase are configured parallel.

As indicated above, in embodiments, the staircase profile may have a tapering spiral shape. This may provide the benefit of providing facile assembly and control of the light generating device. The use of a spiral shape may allow for a single light generating device to cover the complete surface of the staircase profile, which may result in a single light generating device having to be incorporated into the light generating system assembly and electrically connected. However, also in embodiments wherein the staircase has a tapering spiral profile or shape, a plurality of light generating devices may be applied.

The staircase profile may, in embodiments, have a spiral shape, such as a tapering spiral shape. Especially, in embodiments, the staircase profile may have a spiral shape. Additionally or alternatively, the staircase profile may have multiple spiral shapes, especially a double spiral shape (or "double helix shape"), even more especially a triple spiral shape (or "triple helix shape"). Hence, in embodiments, the staircase profile may have multiple spiral shapes. In specific embodiments, the staircase profile may have a double helix spiral shape. In another embodiment, the staircase profile may have a triple helix spiral shape.

In embodiments, the light generating system may comprise a light generating device. The light generating device, in embodiments, may comprise a first end and a second end. Further, the light generating system may comprise an electrical connector for connection with an external source of electrical energy. The first end of the light generating device may be configured closer to the electrical connector than the second end.

Yet further, in embodiments, the light generating system may comprise electronics configured in the housing. As can be derived from the above, such electronics may comprise a driver, such as a LED driver. Especially, the light generating system may comprise an electrical connection between the electronics and the light generating device.

The term "electrical connection" may also refer to a plurality of electrical connections.

In embodiments, the electronics may be connected to the light generating device at a position closer to the first end than the second end. Hence, in specific embodiments, the light generating system may comprise a light generating device, wherein the light generating device may comprise a first end and a second end; wherein the light generating system may comprise an electrical connector for connection with an external source of electrical energy, wherein the first end may be configured closer to the electrical connector than the second end; wherein the light generating system may comprise electronics configured in the housing; wherein the light generating system may further comprise an electrical connection between the electronics and the light generating device, wherein the electrical connection may be connected to the light generating device at a position closer to the first end than the second end.

Hence, in embodiments the light generating system may comprise electronics configured in the housing. These electronics may be functionally coupled with the electrical connector. In embodiments, an electrical connection may be present between the electronics and the light generating device.

As there may, in embodiments, be more than one light generating devices, one or more electrical connections may be present between the electronics and the multiple light generating devices. The electrical connection may, in embodiments, be connected to a light generating device at a position closer to the first end of the light generating device than the second end of the light generating device. More especially, the electrical connections may be connected to the one or more light generating devices at a position closer to the first end of the one or more light generating devices than the second end of the one or more light generating devices. During operation, the electrical connection may provide a circuit for the electrical energy to flow from the external source of electrical energy via the electrical connector and the electronics to the one or more light generating devices.

Concentrically configuring the stairs of the staircase profile and mounting at least two light generating devices on those stairs, especially stairs configured in concentric circles or multiple concentrically configured spiral shapes, may be advantageous as it may allow for the facile incorporation of a multiple-scene switching driver (see also below).

In a specific embodiment, a kind of double spiral may be applied (double helical structure). For instance, the use of multiple spiral shapes may allow for the implementation of a multiple-scene switching driver in the light generating system. The multiple-scene switching driver may provide flexibility in controlling the lumen output of the light generating system.

As there are a plurality of light sources, this may allow in embodiments controlling one or more of the beam shape of the system light, the radiant flux of the system light, and the spectral power distribution of the system light. Likewise, as, in embodiments, there may be more than one light generating device, this may (alternatively or additionally) allow in embodiments controlling one or more of the beam shape of the system light, the radiant flux of the system light, and the spectral power distribution of the system light.

Therefore, in embodiments the system may comprise a control system, configured to control the light generating device (i.e. including controlling a plurality of light generating devices in embodiments wherein there is more than one light generating device). In embodiments, the control system may be configured in the housing. In other embodiments, the control system may be configured external of the housing. In yet other embodiments, the control system may comprise a slave control system configured in the housing and an external master control system, configured external of the housing. Especially, the control system may be configured to control one or more of the beam shape of the system light, the radiant flux of the system light, and the spectral power distribution of the system light.

The term "controlling" and similar terms especially refer at least to determining the behavior or supervising the running of an element. Hence, herein "controlling" and similar terms may e.g. refer to imposing behavior to the element (determining the behavior or supervising the running of an element), etc., such as e.g. measuring, displaying, actuating, opening, shifting, changing temperature, etc. Beyond that, the term "controlling" and similar terms may additionally include monitoring. Hence, the term "controlling" and similar terms may include imposing behavior on an element and also imposing behavior on an element and monitoring the element. The controlling of the element can be done with a control system, which may also be indicated as "controller". The control system and the element may thus at least temporarily, or permanently, functionally be coupled. The element may comprise the control system. In embodiments, the control system and element may not be physically coupled. Control can be done via wired and/or wireless control. The term "control system" may also refer to a plurality of different control systems, which especially are functionally coupled, and of which e.g. one control system may be a master control system and one or more others may be slave control systems. A control system may comprise or may be functionally coupled to a user interface.

The control system may also be configured to receive and execute instructions form a remote control. In embodiments, the control system may be controlled via an App on a device, such as a portable device, like a Smartphone or I-phone, a tablet, etc., The device is thus not necessarily coupled to the lighting system, but may be (temporarily) functionally coupled to the lighting system. Hence, in embodiments the control system may (also) be configured to be controlled by an App on a remote device. In such embodiments the control system of the lighting system may be a slave control system or control in a slave mode. For instance, the lighting system may be identifiable with a code, especially a unique code for the respective lighting system. The control system of the lighting system may be configured to be controlled by an external control system which has access to the lighting system on the basis of knowledge (input by a user interface of with an optical sensor (e.g. QR code reader) of the (unique) code. The lighting system may also comprise means for communicating with other systems or devices, such as on the basis of Bluetooth, WIFI, LiFi, ZigBee, BLE or WiMAX, or another wireless technology.

The system, or apparatus, or device may execute an action in a "mode" or "operation mode" or "mode of operation" or "operational mode". The term "operational mode may also be indicated as "controlling mode". Likewise, in a method an action or stage, or step may be executed in a "mode" or "operation mode" or "mode of operation" or "operational mode". This does not exclude that the system, or apparatus, or device may also be adapted for providing another controlling mode, or a plurality of other controlling modes. Likewise, this may not exclude that before executing the mode and/or after executing the mode one or more other modes may be executed.

However, in embodiments a control system may be available, that is adapted to provide at least the controlling mode. Would other modes be available, the choice of such modes may especially be executed via a user interface, though other options, like executing a mode in dependence of a sensor signal or a (time) scheme, may also be possible. The operation mode may in embodiments also refer to a system, or apparatus, or device, which can only operate in a single operation mode (i.e. "on", without further tunability).

Hence, in embodiments, the control system may control in dependence of one or more of an input signal of a user interface, a sensor signal (of a sensor), and a timer. The term "timer" may refer to a clock and/or a predetermined time scheme.

Additionally or alternatively, in embodiments, the light generating system may comprise a multiple-scene switching driver. The multiple-scene switching driver may, allow for controlling the luminous flux of the light generating system based on variation in electrical current or based on variation in the amount of light generating devices activated. Especially, in embodiments, a light generating system comprising at least two light generating devices may provide multiple scenes. The scenes may comprise light settings varying in lumen output. In embodiments, the multiple-scene switching driver may be configured to switch between scenes of low luminous flux, average luminous flux and high luminous flux. Especially, the multiple-switching driver may be configured to switch between two or more scenes, such as three or more scenes, like four or more scene, especially five or more scenes. Furthermore, the multiple-scene switching driver scenes may comprise light settings varying in system light color. For example, in embodiments, the multiple-scene switching driver scenes may comprise scenes selected from the group comprising a warm white light scene, a cool white light scene, a blue light scene, a green light scene, a yellow light scene, an orange light scene, a red light scene, a magenta light scene, and a violet light scene. In embodiments, the multiple-scene switching driver may be comprised by the electronics. In embodiments, the multiple-scene switching driver may be comprised by the control system.

In specific embodiments, the housing may comprise a crevice. More especially, the reflective inner surface may comprise a crevice. In embodiments, the crevice may comprise an electrical connection (see above). In specific embodiments, the light generating system may comprise electronics configured in the housing, wherein the housing may comprise a crevice, wherein the crevice may also comprise the electrical connection, wherein the electrical connection may be configured to electrically connect one or more light generating devices, in specific embodiments the at least two light generating devices. With such system it may e.g. be possible to electrically connect two or more light generating devices within the light generating system. In embodiments, two or more light generating devices may be electrically connected together. Alternatively or additionally, in (other embodiments), two or more light generating devices may also be electrically connected separately. The crevice may, in embodiments, have a cross-sectional shape selected from the group comprising a curved shape, a cuboid shape, a trigonal shape, and a polygonal shape. Additionally or alternatively, in embodiments, the crevice may have an irregularly shaped cross-sectional shape. Furthermore, the crevice may have a depth and a width, wherein the depth may be selected from the range of 0.5-10 mm, such as from the range of 1-5 mm, and wherein the width may be selected from the range of 0.5-10 mm, like from the range of 1-5 mm. In embodiments, the depth and width of the crevice may have an aspect ratio of 1:1. Additionally or alternatively, in embodiments, the depth and width of the crevice may have an aspect ratio of 1:2 or 2:1. Furthermore, in another embodiment, the depth and width of the crevice may have an aspect ratio of 1:3 or 3:1. Especially, in embodiments, the depth and width of the crevice may have an aspect ratio of 2:3 or 3:2.

The crevice may, in embodiments, comprise the electrical connection as defined above. Especially, in embodiments, the electrical connection may be configured such that it may be electrically isolated from the housing. Furthermore, the electrical connection may be configured to electrically connect the light generating device to the electrical connector via the electronics configured in the housing.

In embodiments, the light generating system may comprise at least two light generating devices. Furthermore, in embodiments, the electronics may be configured to individually control the at least two light generating devices.

Configuring electronics to individually control the at least two light generating devices of an embodiment may be advantageous as it may allow for the facile incorporation of a multiple-scene switching driver. A multiple-scene switching driver may be configured to employ only one of the at least two light generating devices to provide a low lumen output. Additionally or alternatively, the multiple-scene switching driver may be configured to employ more than one of the at least two light generating devices to provide a moderate or a high lumen output. Furthermore, configuring electronics to individually control the at least two light generating devices of an embodiment may also be beneficial to the light generating lifetime of the light generating system. When one of the one or more light generating devices malfunctions, the individual control of the electronics may ensure that the remaining light generating devices may still operate. Thus, the light generating system may still be able to produce at least some system light.

As indicated above, in embodiments, the light generating system may comprise electronics. These electronics may be functionally coupled with the electrical connector. Further, in embodiments, an electrical connection may be present between the electronics and the light generating device. Especially, in embodiments, an electrical connection may be present between the electronics and the multiple light generating devices. During operation, the electrical connection may provide a circuit for the electrical energy to flow from the external source of electrical energy via the electrical connector and the electronics to the one or more light generating devices. In embodiments, the electronics may be configured to control the light generating device. In specific embodiments, the electronics may be configured to control the at least two light generating devices (individually).

In embodiments, the light generating system may comprise a light generating device. Especially, the light generating device may comprise an elongated printed circuit board (or "PCB"). Thus, in specific embodiments, the light generating system may comprise a light generating device, wherein the light generating device may comprise an elongated printed circuit board.

With the present system, it may be possible to provide a compact light generating system with a low cost of production as PCBs are available at low cost. Another advantage provided by the use of a PCB as a light generating device may be that a PCB may be mounted directly to the housing through electronics 3D printing. Furthermore, the PCB may also be more easily connected to the electrical connector through printed conductive tracks using for example copper paste.

Here below, some more specific embodiments of the system are described. In embodiments, the board may comprise a rigid board or a semi-rigid board, especially a rigid board. In other embodiments, the board may comprise a semi-rigid board. In other embodiments, the PCB is a flexible PCB.

In embodiments, the light generating device may comprise an elongated LED filament. An elongated LED filament is highly appreciated as they are very decorative. Further, the LED filament may comprise a plurality of LED light sources. Yet further, in embodiments, the plurality of LED light sources may be encapsulated by an encapsulant. In embodiments, the encapsulant may comprise a luminescent material. Thus, in specific embodiments, the light generating system may comprise a light generating device, wherein the light generating device may comprise an LED filament; wherein the LED filament may comprise a plurality of LED light sources, wherein the plurality of LED light sources may be encapsulated by an encapsulant, wherein the encapsulant may comprise a luminescent material. The use of a LED filament as a light generating device may provide the advantage of improved energy efficiency, as a LED filament may make use of more LED light sources with a low driving current. Furthermore, the LED filament may be beneficial as a light generating device as it may be bendable, thus allowing it to be incorporated in the staircase profile of the housing of the present system.

In embodiments, the light generating device may comprise an elongated LED filament, which may comprise a plurality of LED light sources. Especially, the elongated LED filament may comprise a plurality of in series-connected LED light sources. These LED light sources may, in embodiments, be colored LEDs. In embodiments, the LED light sources may be LEDs selected from the group comprising blue LEDs, red LEDs, yellow LEDs, green LEDs, orange LEDs, purple LEDs and cyan LEDs.

As indicated above, the encapsulant may comprise a luminescent material. Especially, the luminescent material may be configured to convert at least part of the LED light source light into luminescent material light. Together with the LED light, this may provide in embodiments white light. Especially, in embodiments, the luminescent material may comprise a luminescent material selected from the group comprising a red phosphor, an orange phosphor, a yellow phosphor, and a green phosphor.

In embodiments, the light generating device may comprise a LED strip. The LED strip may comprise a plurality of LEDs. The LED strip may be relatively flexible. In yet other embodiments, a plurality of LED strips may be applied. For instance, n LED strips may be applied.

The light generating system may be part of or may be applied in e.g. office lighting systems, household application systems, shop lighting systems, home lighting systems, accent lighting systems, spot lighting systems, theater lighting systems, fiber-optics application systems, projection systems, self-lit display systems, pixelated display systems, segmented display systems, warning sign systems, medical lighting application systems, indicator sign systems, decorative lighting systems, portable systems, automotive applications, (outdoor) road lighting systems, urban lighting systems, green house lighting systems, horticulture lighting, digital projection, or LCD backlighting. The light generating system (or luminaire) may be part of or may be applied in e.g. optical communication systems or disinfection systems.

The terms "light" and "radiation" are herein interchangeably used, unless clear from the context that the term "light" only refers to visible light. The terms "light" and "radiation" may thus refer to UV radiation, visible light, and IR radiation. In specific embodiments, especially for lighting applications, the terms "light" and "radiation" refer to (at least) visible light.

In yet a further aspect, the invention also provides a lamp or a luminaire comprising the light generating system as defined herein. The luminaire may further comprise a housing, optical elements, louvres, etc, etc. . . . The lamp or luminaire may further comprise a housing enclosing the light generating system. The lamp or luminaire may comprise a light window in the housing or a housing opening, through which the system light may escape from the housing. In yet a further aspect, the invention also provides a projection device comprising the light generating system as defined herein. Especially, a projection device or "projector" or "image projector" may be an optical device that projects an image (or moving images) onto a surface, such as e.g. a projection screen. The projection device may include one or more light generating systems such as described herein. Hence, in an aspect the invention also provides a light generating device selected from the group of a lamp, a luminaire, a projector device, a disinfection device, a photochemical reactor, and an optical wireless communication device, comprising the light generating system as defined herein. The light generating device may comprise a housing or a carrier, configured to house or support, one or more elements of the light generating system. For instance, in embodiments the light generating device may comprise a housing or a carrier, configured to house or support one or more of light sources.

The invention also provides an arrangement of two or more lighting systems or of two or more lighting devices, such as a grid of lamps or luminaires. Such grid may be installed in a roof or ceiling. In embodiments, the lighting devices may be functionally connected to the control system. In embodiments, the lighting devices in the grid may comprise a sensor, especially one or more of a radiation sensor and an air flow sensor. In embodiments, the lighting devices may adjust its settings based on the one or more sensor signals of one or more lighting devices. In embodiments, the lighting devices, especially the control systems thereof, may communicate with one another. The lighting devices may comprise means for communicating with other units, systems or devices, such as on the basis of Bluetooth, WIFI, LiFi, ZigBee, BLE or WiMAX, or another wireless technology.

BRIEF DESCRIPTION OF THE DRAWINGS

Embodiments of the invention will now be described, by way of example only, with reference to the accompanying schematic drawings in which corresponding reference symbols indicate corresponding parts, and in which.

The schematic drawings are not necessarily to scale.

DETAILED DESCRIPTION OF THE EMBODIMENTS

Figure 1:
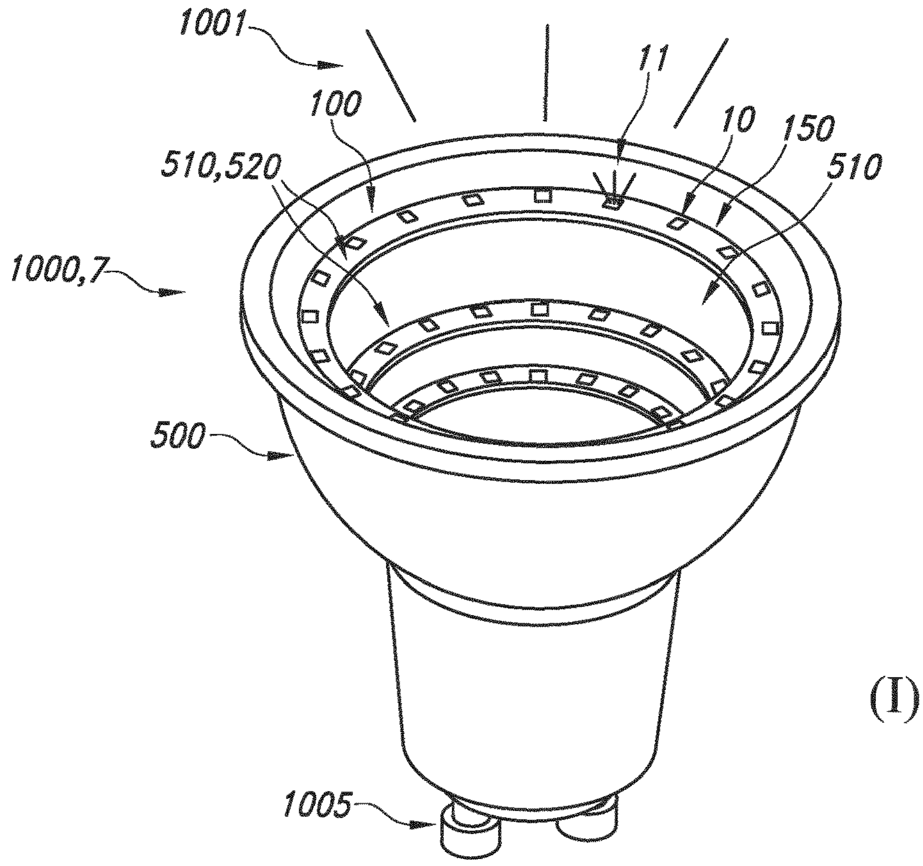
FIGS. 1-5 schematically depict embodiments of the invention and some general aspects.
Figure 1:
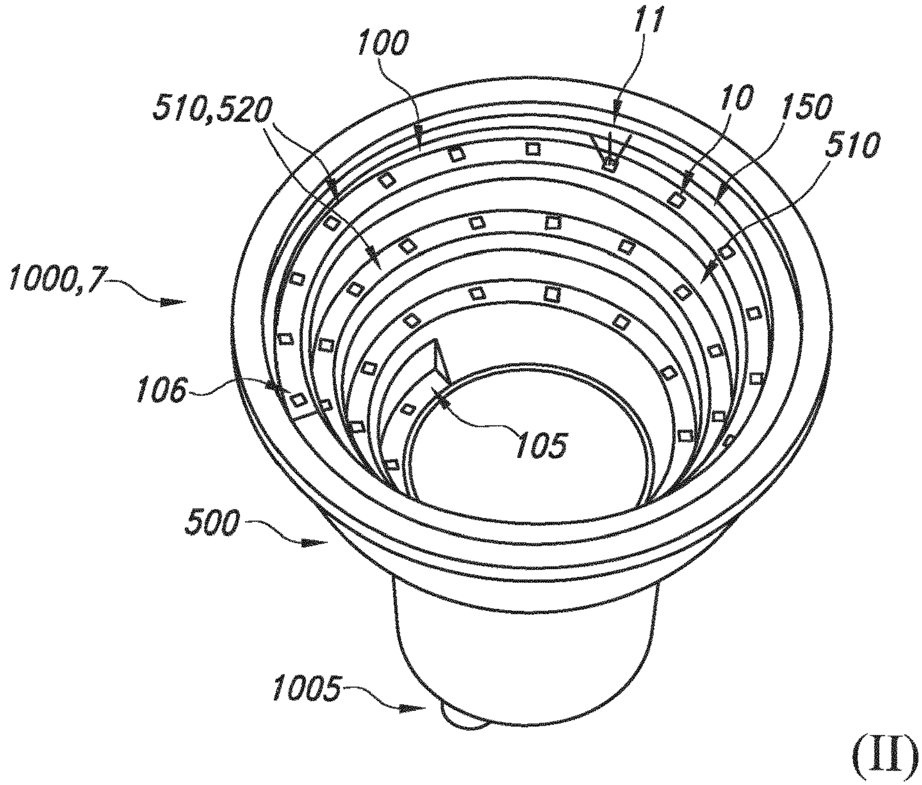
Figure 1:
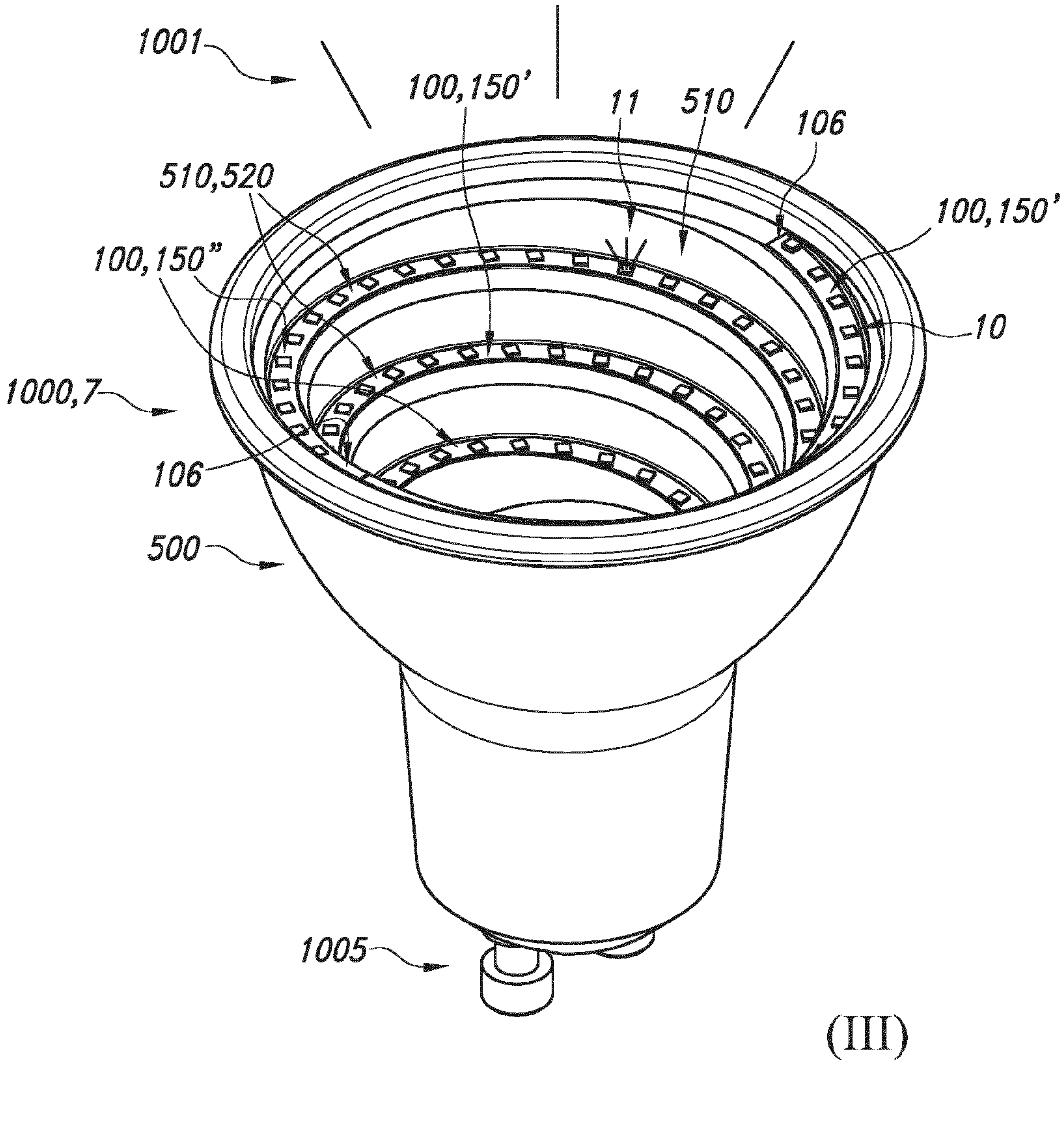

FIG. 1 schematically depicts embodiments of the invention. In embodiments, the invention may be a light generating system 1000 comprising a housing 500, and a light generating device 100. Especially, the light generating device 100 may comprise an elongated support 150. The elongated support may be mechanically attached to the reflective inner surface. In addition, the elongated support 150 may have a support length L2, wherein $0.5 \leq L2/L1 \leq 1$. It may further comprise a plurality of light sources 10. Especially, the light sources may comprise solid state light sources. In embodiments, the light sources 10 may be supported by the elongated support 150. The light sources 10 may, in embodiments, be configured to generate light source light 11. Further, in embodiments, the housing 500 may be thermally conductive. Especially, the housing 500 may comprise a thermally conductive material. More especially, the housing 500 may have a thermal conductivity selected from the range of ≥0.8 W/(m*K). Yet further, in embodiments, the housing 500 may comprise a reflective inner surface 510. The light generating device 100 may be configured in physical contact with the reflective inner surface 510. In addition, the reflective inner surface 510 may have a reflection for the light source light 11 in the range of R≥85% assuming perpendicular irradiation of the reflective inner surface 510.

Furthermore, the housing 500 may comprise a staircase profile 520 with n stairs 521. More especially, the staircase profile 520 may comprise n≥2 stairs 521. Further, in embodiments, the n stairs 521 may have a total stair length L1. Yet further, in embodiments the reflective inner surface 510 may be reflective for the light source light 11. The light generating device 100, in embodiments, may be mounted on the staircase profile 520 over at least part of the stair length L1. Further, the light generating device 100 may, in embodiments, be configured in thermal contact with the housing 500.

Reference 7 refers to an assembly of the housing 500 and the light generating device(s) and optionally a light transmissive window (see also below).

The light generating system 1000 may be configured to generate system light 1001 comprising light source light 11.

Especially, in embodiments, at least part of the system light 1001 may comprise light source light 11 reflected at the reflective inner surface 510 of the housing 500.

In embodiments, the light generating device 100 may comprise a first end 105 and a second end 106. Further, the light generating system 1000 may comprise an electrical connector 1005 for connection with an external source of electrical energy. The first end 105 of the light generating device may be configured closer to the electrical connector 1005 than the second end 106.

Yet further, FIG. 1 (I) schematically depicts an embodiment of a light generating system 1000, wherein the staircase profile 520 may comprise concentrically configured stairs 521. The light generating system 1000 may further comprise at least two light generating devices 100. In embodiments, the at least two light generating devices 100 may be mounted on at least two of concentrically configured stairs 521. FIG. 1 (II) schematically depicts another embodiment of a light generating system 1000, wherein the staircase profile 520 may have a tapering spiral shape. FIG. 1 (III) schematically depicts yet another embodiment of a light generating system 1000, wherein the staircase profile 520 may have a tapering spiral shape. Especially, wherein at least two light generating devices may be mounted in a double helix (like) configuration on the tapering spiral shape. Herein two separate elongated supports 150 are distinguished by the denotations 150' and 150". Note that such denotations may also apply to the corresponding light generating devices 100 (i.e. 100' and 100") and the corresponding second ends 106 (i.e. 106' and 106"), which are however not further separately indicated.

Figure 2:
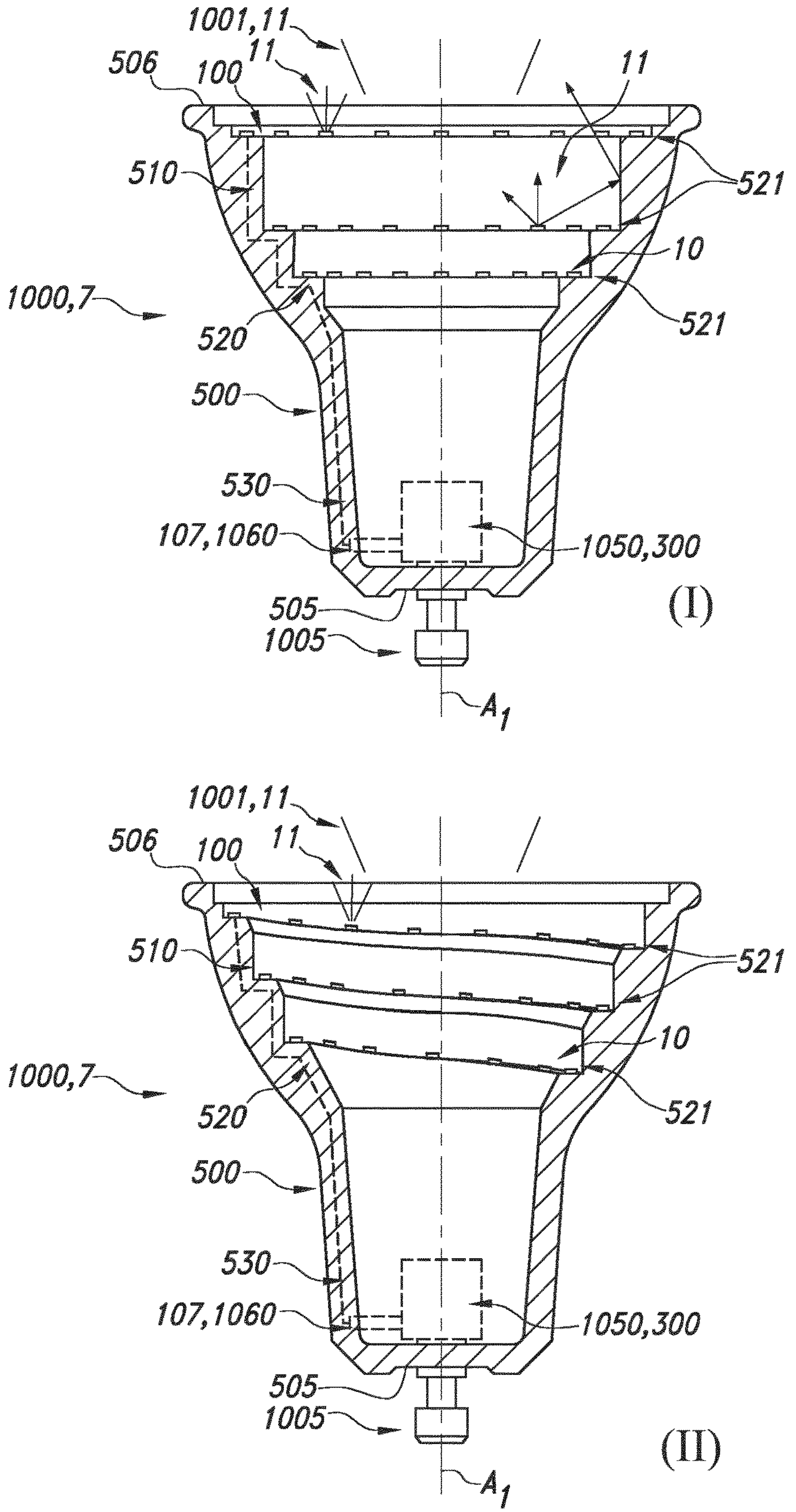

FIG. 2 schematically depicts another embodiment of the invention. In embodiments, the invention may be a light generating system 1000 comprising a housing 500, and a light generating device 100. The housing 500 may, in embodiments, comprise a first housing end 505 and a second housing end 506. Further, in embodiments, the light generating system 1000 may comprise electronics 1050 configured in the housing 500. Especially, the light generating system 1000 may comprise an electrical connection 1060 between the electronics 1050 and the light generating device 100. More especially, in embodiments, the electronics 1050 may be connected to the light generating device 100 at a position 107 closer to the first end 105 than the second end 106. Reference 300 indicates a control system. Here, the electronics 1050 may comprise the control system 300. However, this may also be the other way around. Further, a master control system may be configured to external of the unit 7. Furthermore, in embodiments, the housing 500 may comprise a crevice 530. Further, the crevice 530 may comprise the electrical connection (1060). In embodiments, the light generating system 1000 may comprise at least two light generating devices 100. Therefore, the electrical connection 1060 may be configured to electrically connect the at least two light generating devices 100. Furthermore, in embodiments, the light generating system 1000 may comprise electronics 1050. Especially, the electronics 1050 may, in embodiments, be configured to individually control the at least two light generating devices 100.

FIG. 2 (I) schematically depicts an embodiment of a light generating system 1000, wherein the staircase profile 520 may comprise stairs 521 configured in concentric circles. The light generating system 1000 may further comprise at least two light generating devices 100. In embodiments, the at least two light generating devices 100 may be mounted on at least two of concentrically configured stairs 521. FIG. 2 (II) schematically depicts another embodiment of a light generating system 1000, wherein the staircase profile 520 may have a tapering spiral shape.

Further, lamp axis A1 may be an axis of the light generating system.

FIG. 2 also shows embodiments of the housing material having variable wall thicknesses. Furthermore, in embodiments, the outer side of the housing may hug the staircase profile of the reflective inner surface. Therefore, the outer side of the housing may, in embodiments, also comprise a staircase profile. However, as depicted here in another embodiment, the outer side of the housing may have a rounded cone shape.

Figure 3:
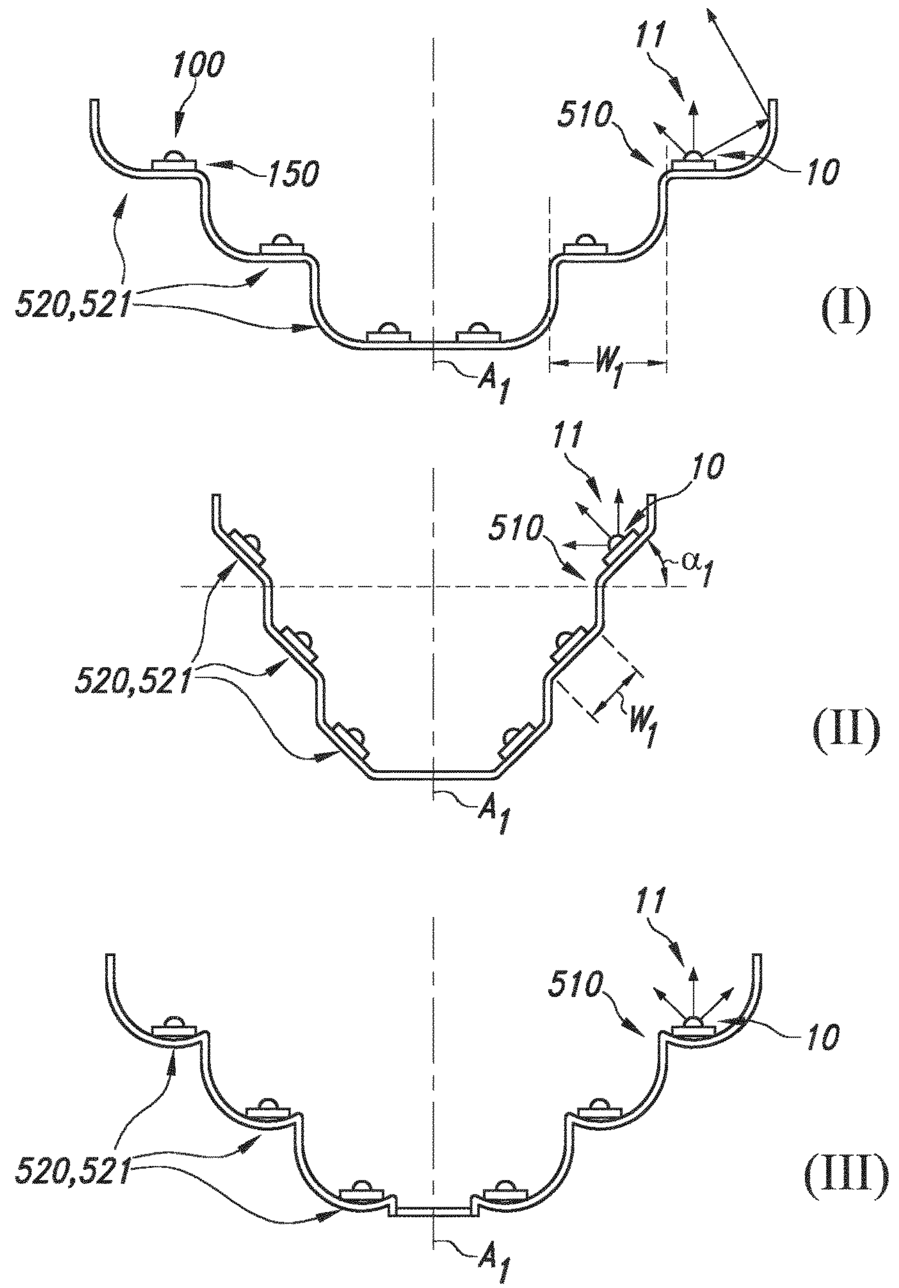

FIG. 3 schematically depicts another embodiment of the invention. Especially, FIG. 3 depicts a cross section of the staircase profile 520 of the light generating system 1000. In embodiments, the invention may be a light generating system 1000 comprising a light generating device 100 and a reflective inner surface 510. In embodiments, the reflective inner surface 510 may comprise a staircase profile 520. Especially, the staircase profile 520 may comprise $n \geq 2$ stairs 521. In embodiments, lamp axis A1 may be an axis of the light generating system 1000 (especially the assembly).

In embodiments, at least one of the n stairs 521 of the staircase profile 520 may be in a plane perpendicular the lamp axis A1 (see (I)). Reference W1 indicates a stair width. In embodiments, at least one of the n stairs 521 of the staircase profile 520 may be tilted relative to an lamp axis A1 (see (II)). Here, a tilt angle $\alpha 1$ relative to a plane perpendicular to the lamps axis A1 is schematically depicted. Yet further, in embodiments, at least one of the n stairs 521 of the staircase profile 520 may have a parabolic shape (see (III)).

Figure 4:
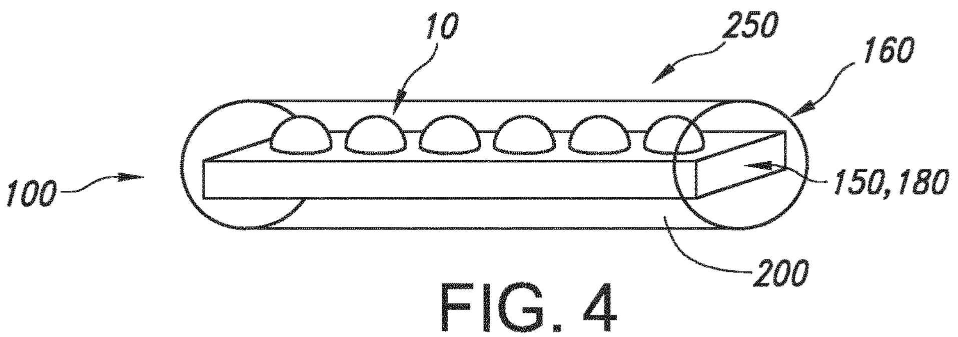

FIG. 4 schematically depicts another embodiment of the invention. In embodiments, the invention may be a light generating system 1000 comprising a light generating device 100. The light generating device, in embodiments, may comprise an elongated support 150. Especially, in embodiments, the light generating device may comprise a printed circuit board 180. Furthermore, in other embodiments, the light generating device 100 may comprise an elongated LED filament 250. Further, the LED filament 250 may comprise a plurality of LED light sources 10. Yet further, in embodiments, the plurality of LED light sources 10 may be encapsulated by an encapsulant 160. In embodiments, the encapsulant 160 may comprise a luminescent material 200.

Figure 5A:
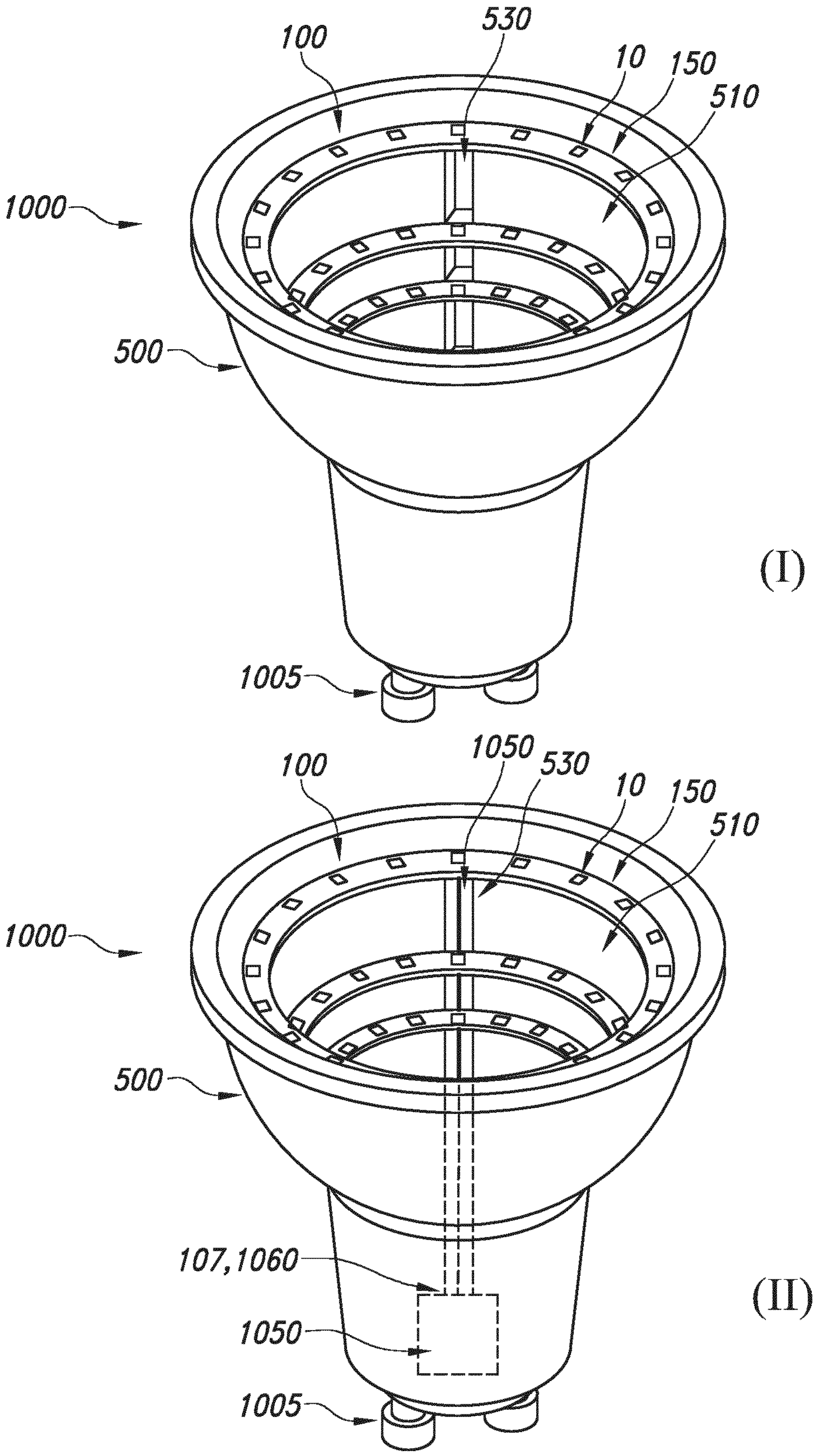

FIG. 5*a* schematically depicts another embodiment of the invention. In embodiments, the invention may be a light generating system 1000 comprising a housing 500, and a light generating device 100. Further, in embodiments, the light generating system 1000 may comprise electronics 1050 configured in the housing 500. Especially, the light generating system 1000 may comprise an electrical connection 1060 between the electronics 1050 and the light generating device 100. Embodiments I and II show essentially the same embodiments, but with different aspects. Furthermore, in embodiments, the housing 500 may comprise a crevice 530. Further, the crevice 530 may comprise the electrical connection 1060. In embodiments, the light generating system 1000 may comprise at least two light generating devices 100. Therefore, the electrical connection 1060 may be configured to electrically connect the at least two light generating devices 100. Furthermore, in embodiments, the light generating system 1000 may comprise electronics 1050. Especially, the electronics 1050 may, in embodiments, be configured to individually control the at least two light generating devices 100.

Figure 5B:
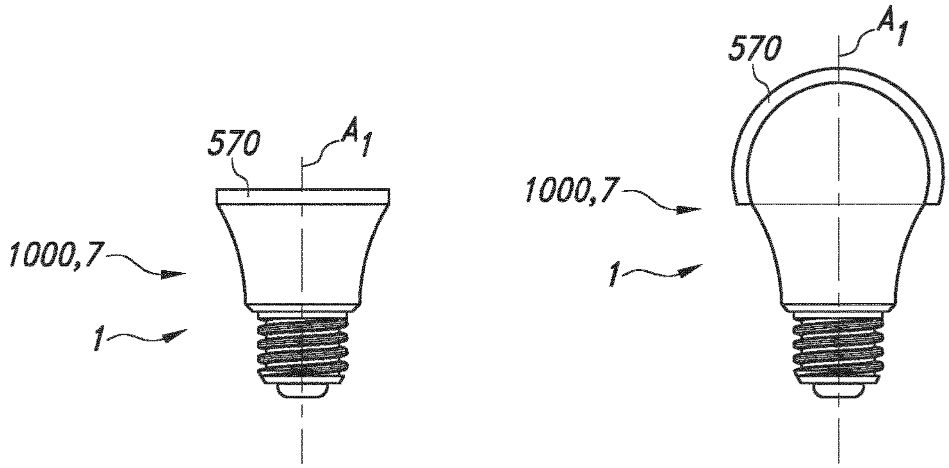

FIG. 5*b* schematically depict two embodiments comprising a light transmissive window 570. Such window may be a closure to the housing. The window 570 may have an envelope shape, as schematically depicted on the right. The light transmissive window may be transparent or translucent.

Figure 5C:
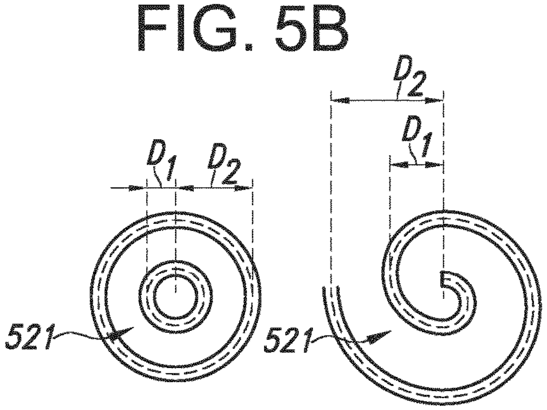

FIG. 5*c* schematically depict a plurality of stairs 521. The dashed lines indicate a center of the stairs, and also indicate the local diameter D. The (accumulated) length of the dashed lines on the left embodiment, or the length of the dashed line on the right embodiment may be the total stair length L1.

Figure 6:
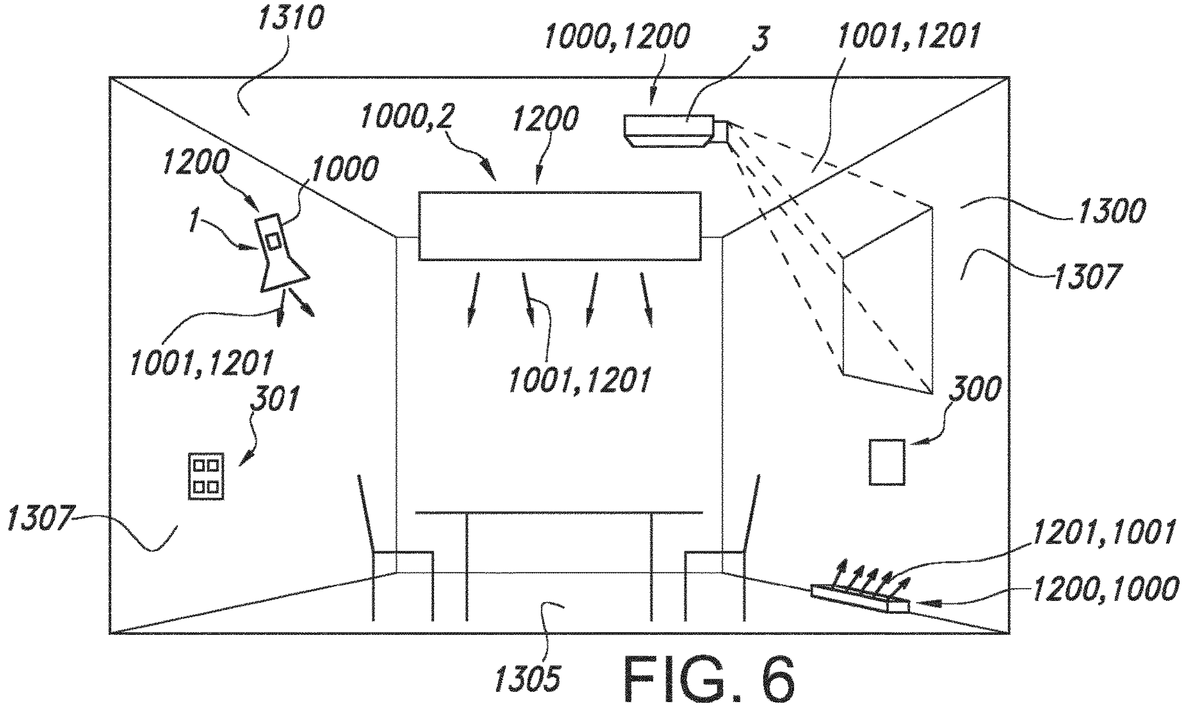
FIG. 6 schematically depicts an embodiment of an application.

FIG. 6 schematically depicts an embodiment of a lighting device 1200. In embodiments, a lighting device 1200 may be selected from the group of a lamp 1, a luminaire 2, a projector device 3, a disinfection device, a photochemical reactor, and an optical wireless communication device, comprising the lighting system 1000 as described herein. Reference 301 indicates a user interface which may be functionally coupled with the control system 300 comprised by or functionally coupled to the lighting system 1000. The figure also schematically depicts an embodiment of lamp 1 comprising the lighting system 1000. Reference 3 indicates a projector device or projector system, which may be used to project images, such as at a wall, which may also comprise the lighting system 1000. In embodiments, such a lighting device may be a lamp 1, a luminaire 2, a projector device 3, a disinfection device, or an optical wireless communication device. Lighting device light escaping from the lighting device 1200 is indicated with reference 1201. Lighting device light 1201 may essentially consist of system light 1001, and may in specific embodiments thus be system light 1001. Reference 1300 indicates a space, such as an office or a living room, wherein the reference 1307 corresponds to the walls of the living room, reference 1305 corresponds to the floor, and reference 1310 corresponds to the ceiling. The luminaire 2 may comprise a plurality of lamp assemblies. The lamp 1 may comprise a single lamp assembly or may essentially be a lamp assembly. Especially, lamp 1 may comprise a spot lamp (which may thus e.g. have an improved thermal performance).

The term "plurality" refers to two or more. The terms "substantially" or "essentially" herein, and similar terms, will be understood by the person skilled in the art. The terms "substantially" or "essentially" may also include embodiments with "entirely", "completely", "all", etc. Hence, in embodiments the adjective substantially or essentially may also be removed. Where applicable, the term "substantially" or the term "essentially" may also relate to 90% or higher, such as 95% or higher, especially 99% or higher, even more especially 99.5% or higher, including 100%. The term "comprise" includes also embodiments wherein the term "comprises" means "consists of".

The term "and/or" especially relates to one or more of the items mentioned before and after "and/or". For instance, a phrase "item 1 and/or item 2" and similar phrases may relate to one or more of item 1 and item 2. The term "comprising" may in embodiments refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices, apparatus, or systems may herein amongst others be described during operation. As will be clear to the person skilled in the art, the invention is not limited to methods of operation, or devices, apparatus, or systems in operation.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

Use of the verb "to comprise" and its conjugations does not exclude the presence of elements or steps other than those stated in a claim. Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

The article "a" or "an" preceding an element does not exclude the presence of a plurality of such elements.

The invention may be implemented by means of hardware comprising several distinct elements, and by means of a suitably programmed computer. In a device claim, or an apparatus claim, or a system claim, enumerating several means, several of these means may be embodied by one and the same item of hardware. The mere fact that certain measures are recited in mutually different dependent claims does not indicate that a combination of these measures cannot be used to advantage. In yet a further aspect, the invention (thus) provides a software product, which, when running on a computer is capable of bringing about (one or more embodiments of) the method as described herein.

The invention also provides a control system that may control the device, apparatus, or system, or that may execute the herein described method or process. Yet further, the invention also provides a computer program product, when running on a computer which is functionally coupled to or comprised by the device, apparatus, or system, controls one or more controllable elements of such device, apparatus, or system.

The invention further applies to a device, apparatus, or system comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A lighting device selected from the group of a lamp and a luminaire, the lighting device comprising:

a light generating system having a housing and a light generating device, wherein the light generating device has an elongated support and a plurality of LED light sources, the plurality of LED light sources are supported by the elongated support, and the plurality of LED light sources are configured to generate light source light;

wherein the housing is thermally conductive, the housing has a reflective inner surface with a staircase profile with n stairs in which n≥2, at least one of the n stairs has a parabolic shape, at least one of the n stairs is in a plane perpendicular to a lamp axis of the light generating system, each of the n stairs have a stair length L1, and the reflective inner surface is reflective for the light source light;

wherein the light generating device is mounted on the staircase profile over at least part of the stair length L1 and configured in thermal contact with the housing;

wherein the light generating device is configured in physical contact with the reflective inner surface, the housing has a thermally conductive material, the elongated support has a support length L2 in which 0.5≤L2/L1≤1, and the housing has a thermal conductivity selected from the range of ≥0.8 W/(m*K); and wherein the light generating device has an elongated LED filament, the LED filament has the plurality of LED light sources encapsulated by an encapsulant with a luminescent material therein.

2. The lighting device according to claim 1, wherein n is selected from the range of 3-6.

3. The lighting device according to claim 1, wherein the elongated support is mechanically attached to the reflective inner surface.

4. The lighting device according to claim 1, wherein the reflective inner surface has a reflection for the light source light in the range of R≥85% assuming perpendicular irradiation of the reflective inner surface.

5. The lighting device according to claim 1, wherein at least one of the stairs of the staircase profile is tilted relative to a lamp axis of the light generating system.

6. The lighting device according to claim 1, wherein the housing comprises a housing wall, wherein the housing wall comprises a material selected from the group comprising aluminum, steel, copper, brass, a polymeric material, a ceramic material, and a 3D printed material.

7. The lighting device according to claim 1, wherein the housing comprises a metal.

8. The lighting device according to claim 1, wherein the light generating device comprises a first end and a second end; wherein the light generating system comprises an electrical connector for connection with an external source of electrical energy, wherein the first end is configured closer to the electrical connector than the second end; wherein the light generating system comprises electronics configured in the housing; wherein the light generating system further comprises an electrical connection between the electronics and the light generating device, wherein the electrical connection is connected to the light generating device at a position closer to the first end than the second end.

9. The lighting device according to claim 1, wherein the staircase profile comprises concentrically configured stairs; wherein the light generating system comprises at least two light generating devices mounted on at least two of concentrically configured stairs.

10. The lighting device according to claim 8, wherein the housing comprises a crevice, wherein the crevice comprises the electrical connection; wherein the light generating system comprises at least two light generating devices; and wherein the electrical connection is configured to electrically connect the at least two light generating devices.

11. The lighting device according to claim 9, wherein the electronics are configured to individually control the at least two light generating devices.

12. The lighting device according to claim 1, wherein the light generating device comprises an elongated printed circuit board.

* * * * *